US007065837B2

(12) United States Patent
Kruepke

(10) Patent No.: US 7,065,837 B2
(45) Date of Patent: Jun. 27, 2006

(54) GUIDE HANDLE FOR A MANUALLY STEERED MACHINE

(75) Inventor: Gregory Kruepke, Waukesha, WI (US)

(73) Assignee: Wacker Corporation, Menomonee Falls, WI (US)

( * ) Notice: Subject to any disclaimer, the term of this patent is extended or adjusted under 35 U.S.C. 154(b) by 0 days.

(21) Appl. No.: 10/703,243

(22) Filed: Nov. 7, 2003

(65) Prior Publication Data

US 2005/0100403 A1 May 12, 2005

(51) Int. Cl.
*B65G 1/00* (2006.01)

(52) U.S. Cl. ............................ 16/430; 16/436; 81/489; 15/143.1; 404/112

(58) Field of Classification Search ............... 16/110.1, 16/421, 430, 436; 404/112; D08/167; D12/178; 81/489; 15/143.1
See application file for complete search history.

(56) References Cited

U.S. PATENT DOCUMENTS

| | | | | | |
|---|---|---|---|---|---|
| D26,339 | S | * | 11/1896 | Billings | D12/178 |
| D26,340 | S | * | 11/1896 | Murphy | D12/178 |
| D27,660 | S | * | 9/1897 | Anschuetz | D12/178 |
| 4,198,178 | A | * | 4/1980 | Carlstrom et al. | 404/112 |
| 4,577,993 | A | | 3/1986 | Allen et al. | |
| 4,673,311 | A | | 6/1987 | Whiteman, Jr. | |
| D323,805 | S | * | 2/1992 | Giard, Jr. | D12/178 |
| D337,748 | S | * | 7/1993 | Adams | D12/178 |
| 5,884,920 | A | | 3/1999 | Seto | |
| 5,993,109 | A | | 11/1999 | Motl et al. | |
| D419,123 | S | * | 1/2000 | Okuda | D12/178 |
| D501,633 | S | * | 2/2005 | Kruepke | D8/107 |

FOREIGN PATENT DOCUMENTS

| | | | |
|---|---|---|---|
| GB | 1 181 852 | A | 2/1970 |

* cited by examiner

*Primary Examiner*—Gary S. Hartmann
(74) *Attorney, Agent, or Firm*—Boyle Fredrickson Newholm Stein & Gratz S.C.

(57) ABSTRACT

A guide handle of a handle assembly for an industrial machine such as a walk behind trowel has the open-ended handlebar characteristics of a so-called "bicycle" style guide handle and the belly bar and gripping versatility characteristics of a "whale tail" style guide handle. The belly bar spans the gap between the two handgrip portions, and both portions are mounted on a center post of the handle assembly at the bottom leg of a generally U-shaped mounting portion. The mounting portion can be welded or otherwise affixed to a post of the handle assembly at any desired angle, thereby permitting the orientation of the guide handle to be optimized for a given guide handle height.

21 Claims, 6 Drawing Sheets

GUIDE HANDLE FOR A MANUALLY STEERED MACHINE

BACKGROUND OF THE INVENTION

1. Field of the Invention

The invention relates to guide handles and, more particularly, relates to a universal guide handle for a walk behind rotary finishing trowel or other manually guided machine.

2. Discussion of the Related Art

Many machines require substantial effort to be manually guided as they traverse a work surface. One such machine is a walk behind concrete finishing trowel or simply "walk behind trowel." Walk behind trowels are generally known for the finishing of concrete surfaces. A walk behind trowel generally includes a rotor formed from a plurality of trowel blades that rest on the ground. The rotor is driven by a motor mounted on a frame or "cage" that overlies the rotor. The trowel is controlled by an operator via a handle assembly extending several feet from the cage. The handle assembly includes a post and a guide handle. The post has a lower end attached to the gearbox and an upper end disposed several feet above and behind the lower end. The guide handle is mounted on the upper end of the post. A blade pitch adjustment mechanism may be mounted on the upper end of the post or the guide handle. Other controls, such as throttle control, a kill switch, etc., may be mounted on the post and/or the guide handle. Substantial manual effort is required to control and steer the machine, and the guide handle must therefore be rather robust and provide secure gripping points for the operator.

Rotary trowels typically have one of two types of guide handles. The first is often known as a "bicycle" style handle. A bicycle style guide handle comprises a pair of handlebars extending laterally outwardly from the center post in much the same style as a bicycle's handlebars. The handlebars typically extend outwardly and upwardly from the center post so that the post and handlebars, in combination, generally take the shape of a Y. In some machines, the handlebars extend horizontally from the post to take the shape of a T. In either event, the terminal ends of the handlebars provide grips for the operator's hands. A bicycle style guide handle is disclosed, e.g., in U.S. Pat. No. 4,673,311, the contents of which are hereby incorporated by reference in its entirety.

A bicycle style guide handle has the advantage of providing discrete gripping points for ease of control. The free ends of the handlebars also provide convenient locations for hanging buckets or the like. However, the guide handle lacks versatility in gripping options because it provides no surfaces other than the handgrips that can be easily grasped. Some bicycle style guide handles also lack a "belly bar" or center bar against which the operator may rest his or her stomach or chest for pushing the machine and/or resisting rearwardly acting reaction forces generated upon machine operation.

The second type of guide handle commonly used in walk behind trowels is a so-called "whale tail" style handle. A whale tail handle is characterized by first and second opposed enclosed handlebars formed by generally U-shaped handle portions that extend generally horizontal outwardly from the center post. The front, lower leg of each U-shaped portion is connected to the center post. The rear, upper leg of each U-shaped portion is connected to or merges with the corresponding leg of the opposite portion. The resultant handle has first and second laterally opposed arcuate gripping portions connected to one another by a belly bar located at the rear of the guide handle. Each handlebar provides a number of different gripping locations that can be grasped by the operator's hands to guide and steer the machine in a manner that best suits that operator's preference. A whale tail style guide handle is disclosed, e.g., in U.S. Pat. No. 5,993,109, the contents of which are hereby incorporated by reference in their entirety. However, the whale tail handle lacks the free ends that are characteristic of a bicycle style guide handle.

Hence, the bicycle style guide handle and the whale tail style guide handle each have unique characteristics and advantages. Some operators prefer the whale tail style guide handle because of the versatility in gripping options provided by the handlebar geometry. Others prefer the bicycle style guide handle because its handlebar free ends can be used to hang objects. In order to accommodate this personal preference, manufacturers sometimes keep both kinds of guide handle in inventory and supply the desired type of guide handle upon demand.

The need therefore has arisen to provide a guide handle for a walk behind concrete finishing trowel or the like that has the most advantageous features of both a bicycle style guide handle and a whale tail style guide handle.

SUMMARY OF THE INVENTION

Pursuant to the invention, a guide handle is provided for an industrial machine such as a walk behind trowel. The guide handle has handlebars with multiple gripping locations that provide versatile gripping options for the operator and a center belly bar that provides a surface against which an operator may press against with his or her chest or stomach. Each handlebar is also provided with an inwardly-facing free end that can serve as a grip or that can be used to hang a bucket or the like. The belly bar spans the gap between the two handlebars. The handlebars and belly bar are mounted on the center post of the guide handle at the bottom leg of a generally U-shaped portion. The mounting portion can be welded or otherwise affixed to a post of a handle assembly at any desired angle, thereby permitting the orientation of the guide handle to be optimized for a given guide handle height.

In accordance with other aspects of the invention, a handle assembly having a guide handle as configured above is provided. A walk behind trowel having the resultant handle assembly is also provided These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

A guide handle constructed in accordance with the present invention may be used to guide a number of different manually controlled industrial machines. It is particularly well-suited for use with a machine that requires substantial manual effort to guide and control as it moves across a generally horizontal surface. Hence, while a preferred guide handle will now be described in conjunction with a walk behind trowel, it is to be understood that the invention is in no way so limited.

Figure 1:
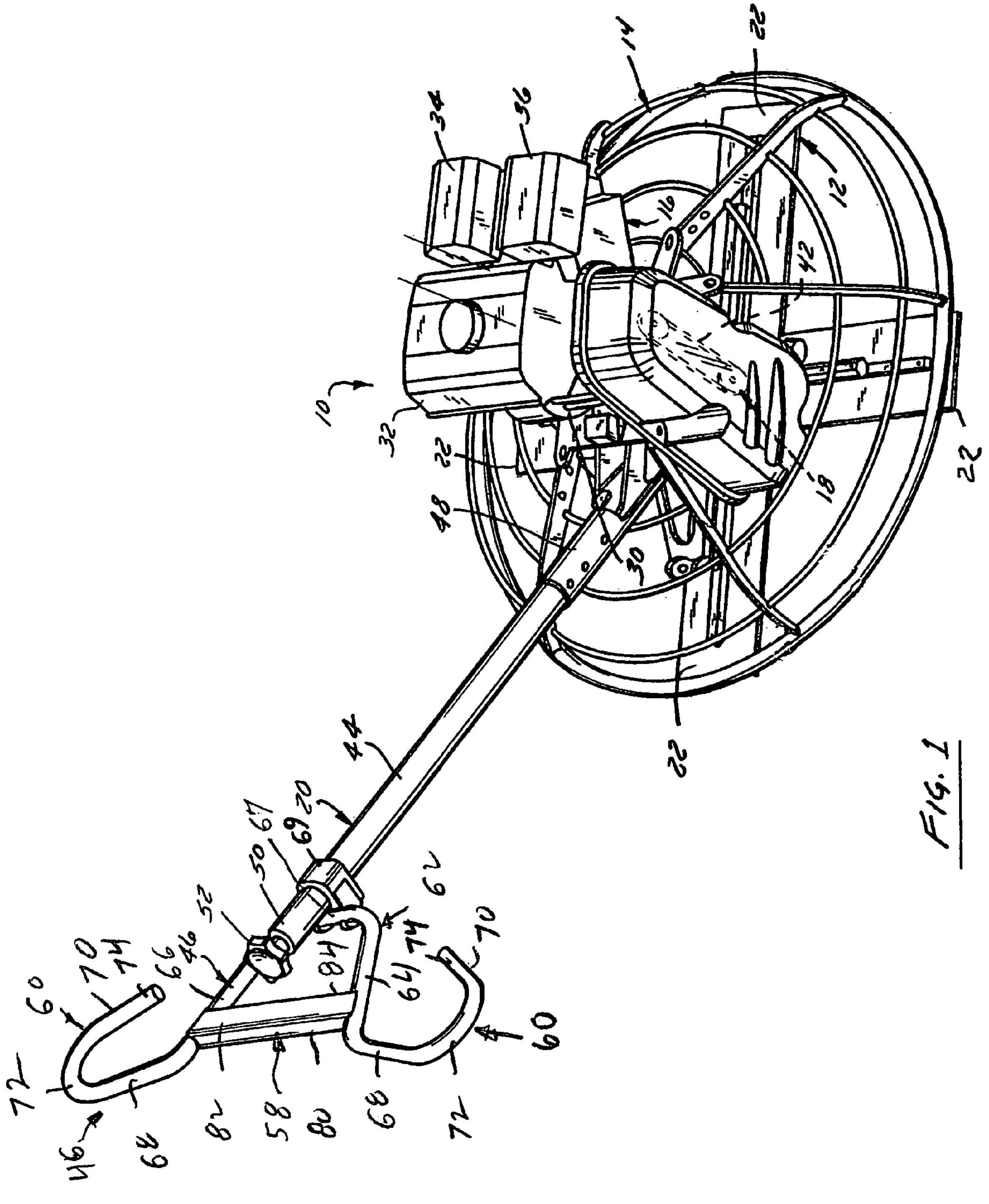
FIG. 1 is a perspective view of a rotary trowel incorporating a guide handle constructed in accordance with the first preferred embodiment of the present invention.
Figure 2:
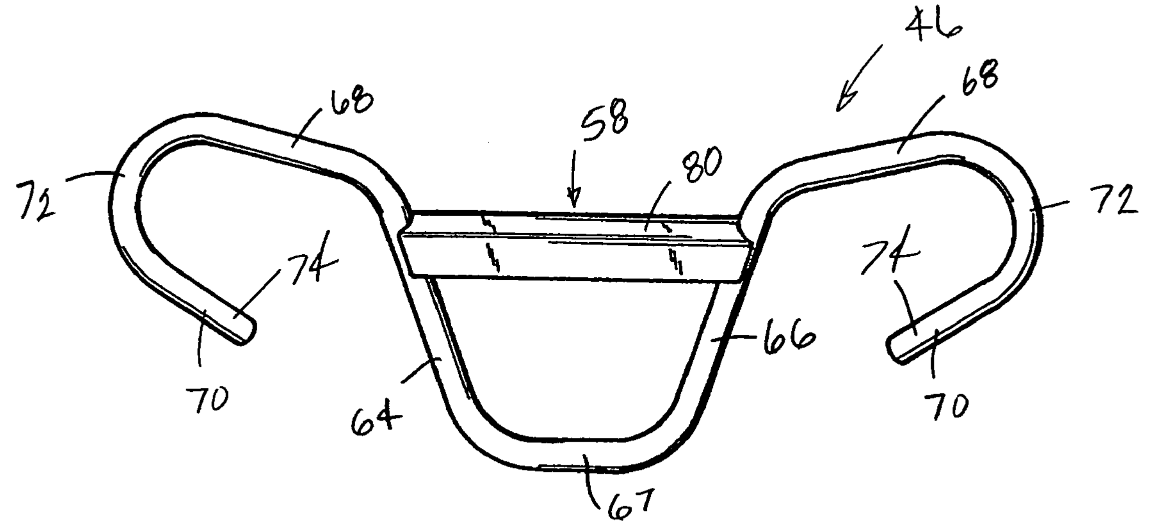
FIG. 2 is a top plan view of the guide handle of FIG. 1.
Figure 3:
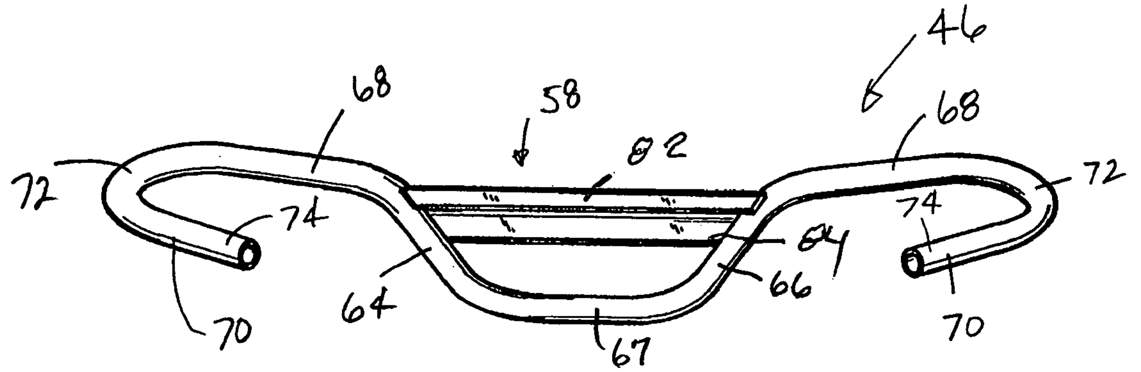
FIG. 3 is a front elevation view of the guide handle of FIG. 1.
Figure 4:
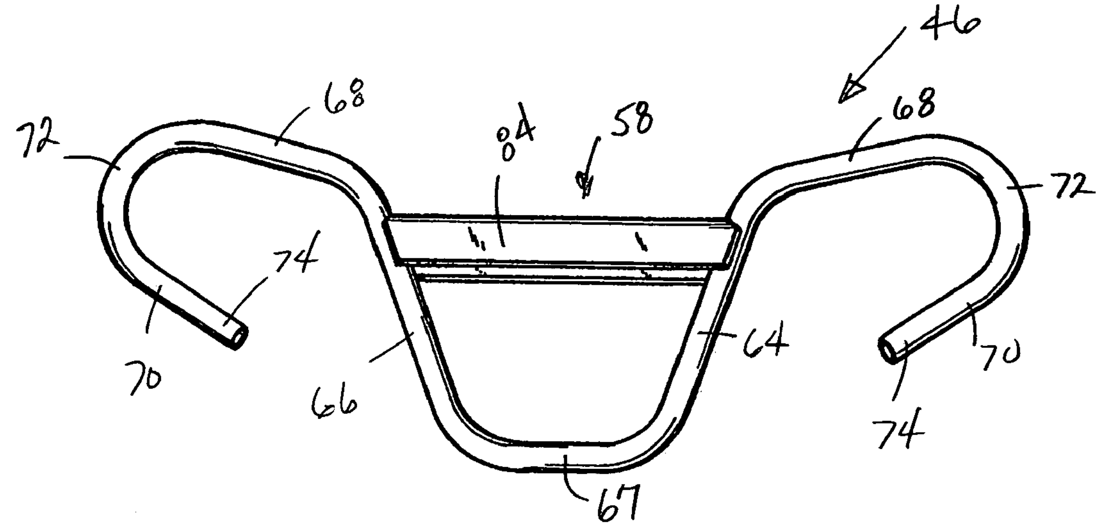
FIG. 4 is a bottom plan view of the guide handle of FIG. 1.
Figure 5:
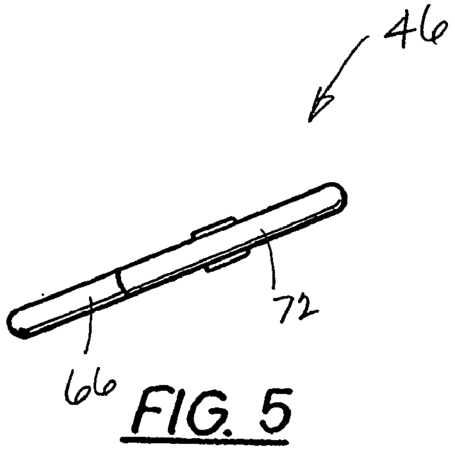
FIG. 5 is a left side elevation view of the guide handle of FIG. 1, the right side elevation view being a mirror image thereof.
Figure 6:
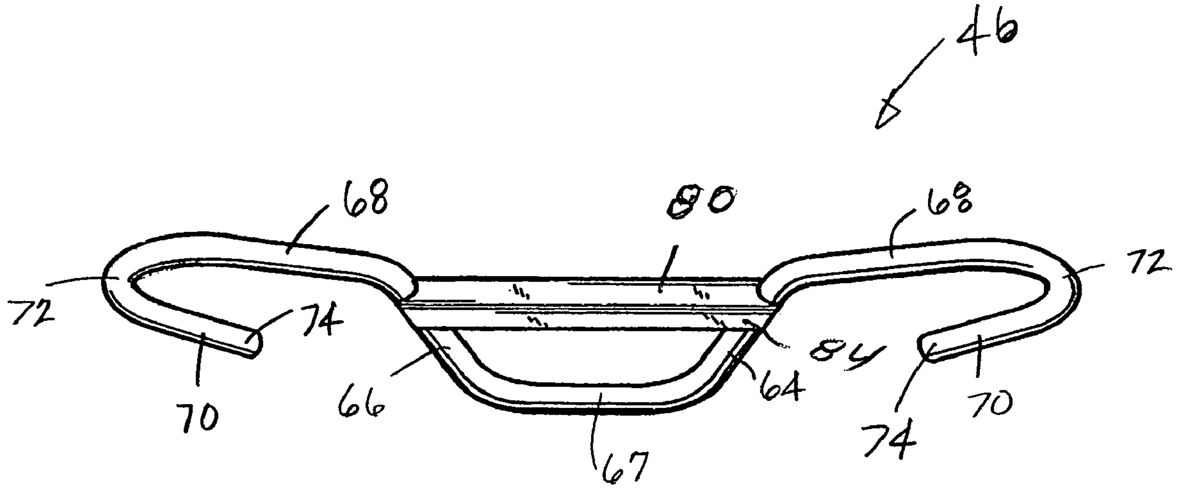
FIG. 6 is a rear elevation view of the guide handle of FIG. 1.
Figure 7:
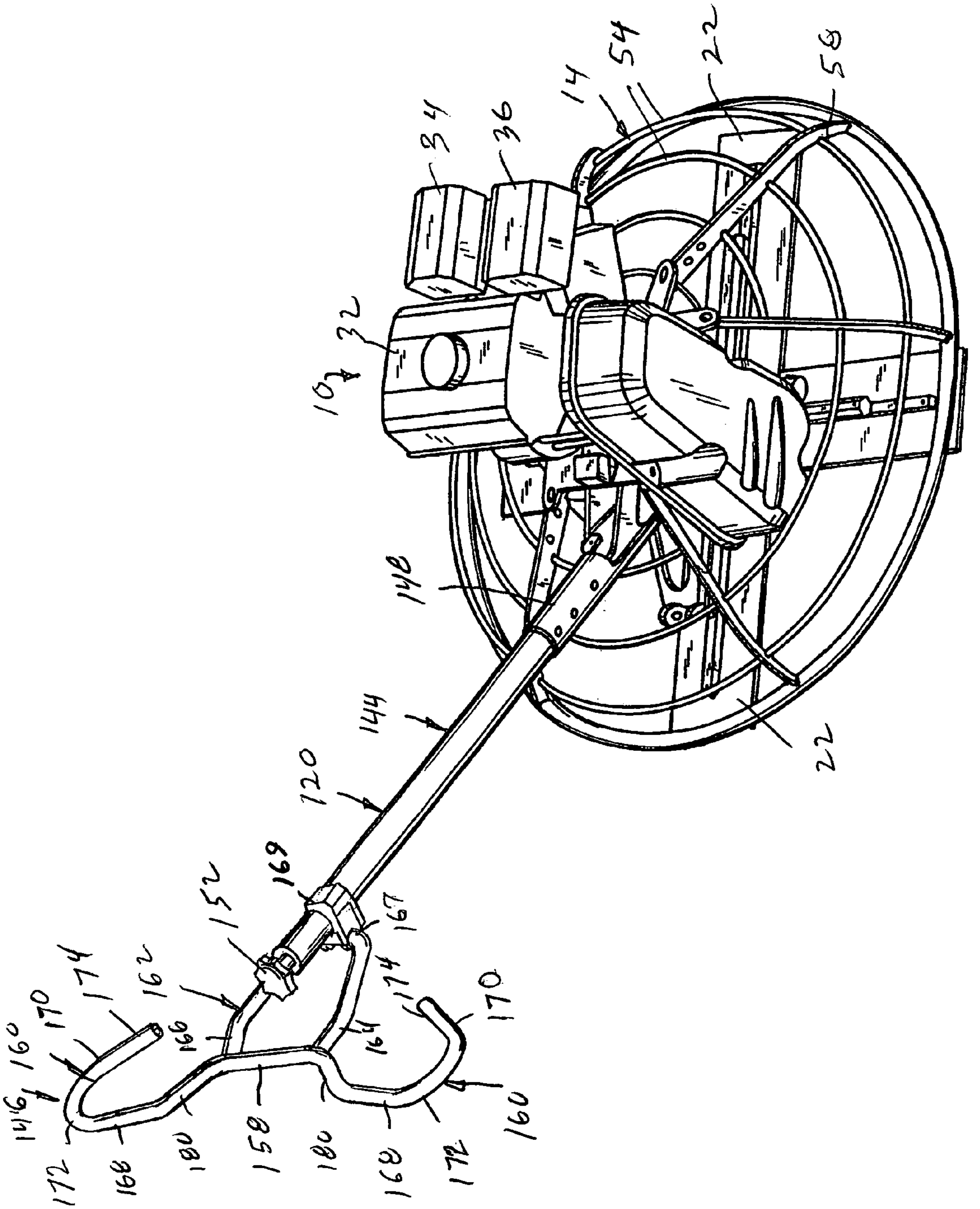
FIG. 7 is a perspective view of a rotary trowel incorporating a guide handle constructed in accordance with a second preferred embodiment of the present invention.
Figure 8:
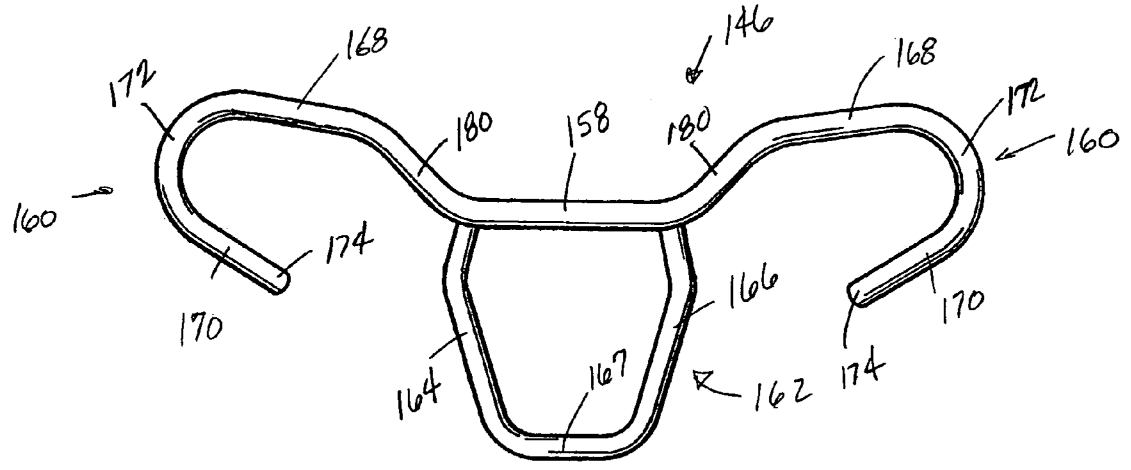
FIG. 8 is a top plan view of the guide handle of FIG. 7.
Figure 9:
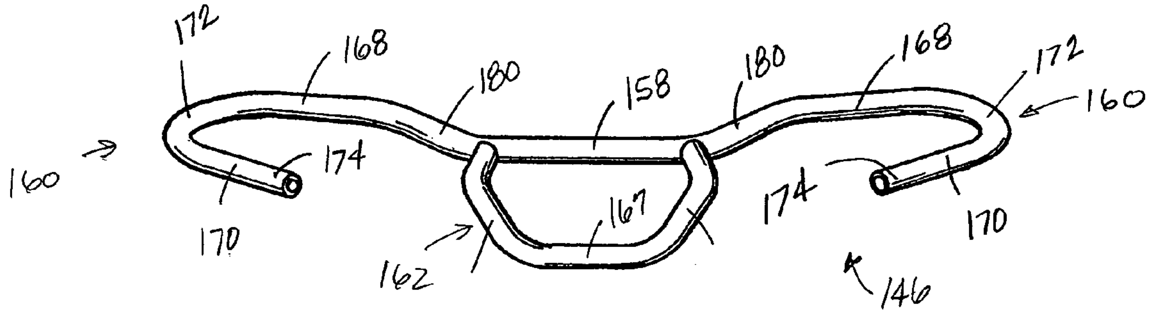
FIG. 9 is a front elevation view of the guide handle of FIG. 7.
Figure 10:
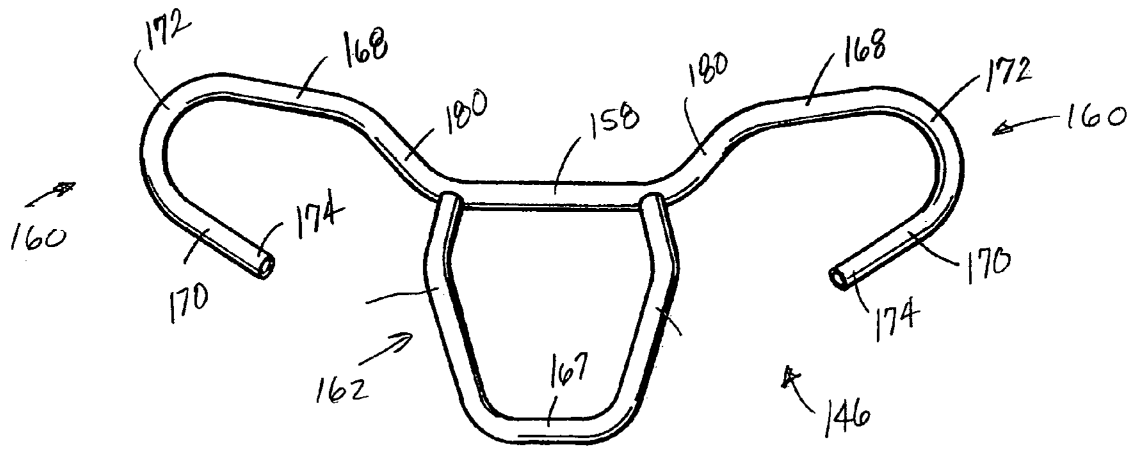
FIG. 10 is bottom plan view of the guide handle of FIG. 7.
Figure 11:
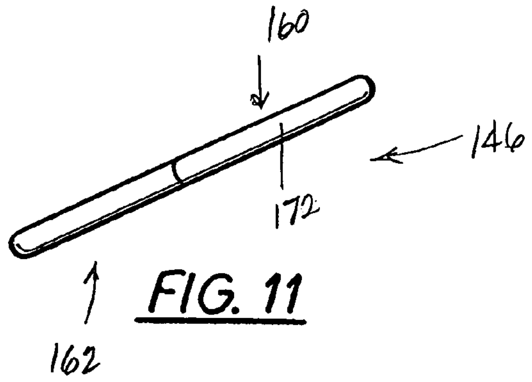
FIG. 11 is a left side elevation view of the guide handle of FIG. 7, the right side elevation view being a mirror image thereof.
Figure 12:
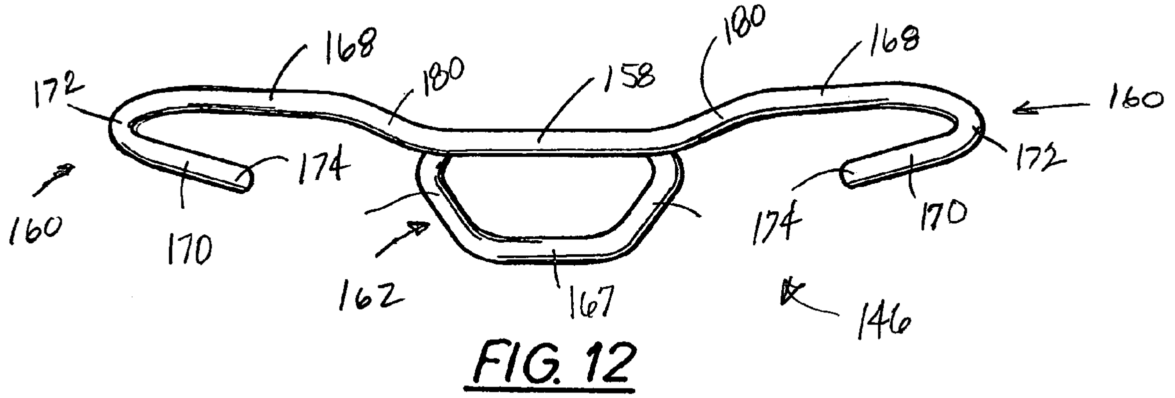
FIG. 12 is a rear elevation view of the guide handle of FIG. 7.

Referring now to FIG. 1, a guide handle constructed with the first embodiment of the invention is illustrated in connection with a walk behind rotary trowel 10. In general, the walk behind trowel 10 includes a rotor 12, a frame or "cage" 14 that overlies and is supported on the rotor 12, an engine 16 that is supported on the frame 14, a drive train 18 operatively coupling the engine 16 to the rotor 12, and a handle assembly 20 for controlling and steering the trowel 10. The rotor 12 includes a plurality of trowel blades 22 extending radially from a hub which, in turn, is driven by a vertical shaft.

The motor 16 comprises an internal combustion engine mounted on the cage 14 above the rotor 12. Referring again to FIG. 1, the engine 16 is of the type commonly used on walk behind trowels. It therefore includes a crankcase 30, a fuel tank 32, an air supply system 34, a muffler 36, an output shaft (not shown), etc. The drive train 18 may be any structure configured to transfer drive torque from the engine output shaft to the rotor input shaft. In the illustrated embodiment, it comprises a centrifugal clutch (not shown) coupled to the motor output shaft and a gearbox that transfers torque from the clutch to the rotor input shaft. The gearbox is coupled to the clutch by a belt drive assembly 42, shown schematically in FIG. 1. The preferred gearbox is a worm gearbox of the type commonly used on walk behind trowels.

The handle assembly 20 includes a post 44 and a guide handle 46 that extends upwardly and rearwardly from the cage 14. The post 44 has a lower end 48 attached to the gearbox and an upper end 50 disposed several feet above and behind the lower end. The guide handle 46 is mounted on the upper end 50 of the post 44. A blade pitch adjustment knob 52 is mounted on the upper end 50 of the post 44. Other controls, such as throttle control, a kill switch, etc., may be mounted on the post 44 and/or the guide handle 46.

Referring now to FIGS. 1–6, the guide handle 46 of this embodiment is known as a "rams head" style guide handle to the extent that it generally resembles the head of a ram. It has both an open ended handlebar characteristic of a bicycle style guide handle and a center "belly bar" characteristic and versatility of gripping options of a whale tail style guide handle. It therefore includes a belly bar 58 and opposed open-ended handlebars 60. These structures are integrated in an aesthetically pleasing manner and mounted on the upper end of the post 44 in any convenient manner, preferably using a mounting portion 62 as described below.

In the embodiment of FIGS. 1–6, the handlebars 60 and mounting portion 62 are formed integrally with one another as a single subassembly. The subassembly is formed from an elongated bent tube. The tube of this embodiment is made of bent steel tube stock, but bent steel rod, or any other material that can be formed to the desired shape while providing sufficient rigidity and strength to serve as a control handle, could suffice. The tube is bent symmetrically about its center to form the mounting portion 62.

The mounting portion 62 has first and second generally vertical side legs 64 and 66 connected to one another by a bottom horizontal leg 67. The horizontal leg 67 is fixed to the post 44. It is preferably welded to a saddle 69 provided on the rear of the post 44. Because of its connection to the saddle the post is cylindrical the leg 67 can be oriented at any desired angle $\alpha$, hence permitting selection of guide handle angle. This ability is advantageous because post length and, accordingly, guide handle height varies with the size of the machine. For instance, the post 44 is considerably longer for a 48" trowel than a 30" trowel, resulting in a higher guide handle position for a 48" trowel than a 30" trowel. Operator comfort and steerability can be enhanced by orientating the guide handle 46 at a shallower angle relative to the vertical for a 48" trowel than for a 30" trowel. The angle a for a particular post is preferably pre-selected depending on the length of the post 44 and the resultant handle height. Alternatively other mounting techniques, such as clamping, could be used to fix the guide handle 46 to the post at a desired angle.

Each of the handlebars 60 is formed from a U-shaped bent portion of the rod having upper and lower legs 68 and 70 and a large arcuate center leg 72. The upper leg 68 extends outwardly and slightly upwardly from the upper end of the associated leg 64 or 66 of the mounting portion 62 to the upper end of the center leg 72, and the lower leg 70 extends laterally inwardly and slightly downwardly from the bottom end of the center leg 72 to an inwardly facing free end 74. A conventional grip (not shown) constructed of rubber, plastic, foam, or the like may be mounted on any or all of the legs 68, 70, and 72, providing high versatility in design and high versatility in gripping options for the operator. The free end portion 74 also provides an access point for hanging a bucket or the like.

Alternatively, the handlebars 60 could be formed from segmented bent tubes such as first and second tubes that are symmetrical about the center of the post 44 and that each have an L-shaped inner portion. In this case, the ends of the "L" meet each other underneath the post 44 to form the aforementioned U-shaped mounting portion 62.

The belly bar 58 extends at least generally horizontally between the upper ends of the legs 64 and 66 of the U-shaped mounting portion 62. It preferably is generally coplanar with the center legs 72 of the handlebars 60. As with the handlebars 60, the belly bar 58 preferably is formed of steel (preferably flat bar stock), but could be formed from a rigid plastic or any other material meeting the requirements of strength and rigidity. The bar stock is bent to form upper, front, and rear portions 80, 82, and 84, respectively. The opposed ends of each portion are welded to or otherwise affixed to the remainder of the guide handle 46, preferably at the junction between the handlebars 60 and the mounting portion 62. The ends of the belly bar 58 preferably are grooved in an arcuate manner to form receptacles for the associated legs of the combined handlebar/mounting portion.

In use, the rotor 12 is driven under power of the engine 16 to finish a concrete surface. The operator resists reaction forces generated by this operation and also guides and controls the trowel using the guide handle 46. If desired, the operator may grip the upper leg 68 of each the handlebars 60 in the same manner as a traditional bicycle style guide handle during this operation. Alternatively, the operator may grip the arcuate center legs 72 or the lower legs 70. It is even possible or even preferred to grip one leg 68, 70, or 72 of one handlebar 60 with one hand while gripping a different leg of the opposite handlebar 60 with the opposite hand. For instance, the operator may grip the upper leg 68 of the left handlebar with his or her left hand for comfort while gripping the center leg 72 with his right hand to better resist torque imposed on the guide handle 46 by the rotating rotor 12. No matter how the handlebars 60 are gripped, the operator also has the option of resting his chest or stomach against the belly bar 58 in the same manner as he would using a conventional whale tail style guide handle.

Turning now to FIGS. 7–12, the walk behind trowel 10 of FIG. 1 is shown in conjunction with an alternative handle assembly 120. The handle assembly 120 of this embodiment includes the same post 144, blade pitch adjustment knob 152, and related controls (not shown) as the handle assembly 20 of the first embodiment. It also includes a guide handle 146 that differs from the guide handle 46 of the first embodiment primarily by way of aesthetics and that, therefore, incorporates all of the main characteristics of the guide handle 46 of the first embodiment. Hence, the guide handle 146 includes a belly bar 158, opposed handlebars 160, and a mounting portion 162. The belly bar 158 of this embodiment is formed integrally with the inner ends of the handlebars 160 to form a subassembly. All components of this embodiment are formed from the same type of metal tube or stock.

Each of the handlebars 160 takes generally the same shape as the corresponding handlebar portion of the first embodiment. It therefore includes an upper leg 168, a lower leg 170, and a center arcuate leg 172. The lower leg 170 extends laterally inwardly from the bottom end of the center leg 172 to provide a free end 174. If desired, a conventional grip (not shown) constructed of rubber, plastic, foam, or the like may be mounted on any or all of the legs 168, 170, and 172. The upper leg 168 extends outwardly and upwardly at an angle from an upper end of a link portion 180.

The belly bar 158 of this embodiment is formed integrally with the handlebars 160, taking the form of a straight portion of the bent tube that extends horizontally between the bottom ends of the opposed link portions 180 of the respective handlebars 160.

The mounting portion 162, like the mounting portion 62 of the first embodiment, is generally U-shaped, but is formed from a separate piece of tube stock from the combined handlebars/belly bar. It therefore includes first and second vertical side legs 164 and 166 and a bottom horizontal leg 168. The horizontal leg 168 is affixed to the post 144 via a saddle mount 169 as in the first embodiment. The upper ends of the vertical side legs 164 and 166 are welded or otherwise affixed to the bottom of the opposed ends of the belly bar 158.

The guide handle 146 of this embodiment is operated in generally the same manner as the guide handle 46 of the first embodiment. As such, its operation will not be described.

As indicated above, many changes and modifications may be made to the present invention without departing from the spirit thereof. The scope of some of these changes is discussed above. The scope of others will become apparent from the appended claims

I claim:

1. A guide handle for an industrial machine, comprising:

(A) first and second opposed handlebars, each of which is generally U-shaped, having an upper leg, a center leg, and a lower leg that extends laterally inwardly from said center leg to a free end thereof, wherein the handlebars are curved such that the center leg curves generally rearwardly toward an operator of the machine and the lower leg curves generally forwardly away from the operator such that the free end faces away from the operator;

(B) a belly bar which extends at least generally horizontally between the handlebars; and (C) a mounting portion, positioned forwardly of the belly bar, for mounting the guide handle on the industrial machine.

2. The guide handle as recited in claim 1, wherein said upper leg of each of said handlebars extends upwardly from a laterally inner end thereof to a laterally outer end thereof, and wherein said lower leg extends downwardly at an angle from said center leg to said free end.

3. The guide handle as recited in claim 1, wherein said belly bar is generally co-planar with said center leg of each of said handlebars.

4. The guide handle as recited in claim 1, wherein a handgrip is provided on at least one of the upper, lower, and center legs of each of said handlebars.

5. The guide handle as recited in claim 1, wherein said mounting portion is fanned integrally with said handlebars.

6. The guide handle as recited in claim 1, wherein said handlebars and said belly bar are formed integrally with one another to form a subassembly, and wherein said mounting portion is connected to said subassembly.

7. The guide handle as recited in claim 6, wherein said subassembly and said mounting portion are all formed from tube stock.

8. The guide handle as recited in claim 6, further comprising first and second link portions, each of which extends upwardly at an angle from an outer end of said belly bar to an inner end of the upper leg of a respective handlebar.

9. A guide handle for an industrial machine, comprising:

(A) first and second opposed handlebars, each of which is generally U-shaped, having an upper leg, a center leg, and a lower leg that extends laterally inwardly from said center leg to a free end thereof;

(B) a belly bar which extends at least generally horizontally between the handlebars: and (C) a mounting portion that supports said handlebars and said belly bar and that is adapted to support said handlebars and said belly bar on another component of the industrial machine, wherein said mounting portion is formed integrally with said handlebars, and wherein said mounting portion is generally U-shaped, having a lower leg adapted for mounting on the another component of the industrial machine and first and second side legs, each of which extends generally vertically from said lower leg to the upper leg of an associated handlebar.

10. The guide handle as recited in claim 9, wherein said handlebars and said mounting portion are formed from bent tube stock.

11. The guide handle as recited in claim 10, wherein said belly bar extends between and is connected to upper ends of said first and second legs of said mounting portion.

12. The guide handle as recited in claim 10, wherein said belly bar is made from flat barstock.

13. A guide handle for an industrial machine, comprising:

(A) first and second opposed handlebars, each of which is generally U-shaped, having an upper leg, a center leg, and a lower leg that extends laterally inwardly from said center leg to a free end thereof;

B) a belly bar which extends at least generally horizontally between the handlebars; and (C) a mounting portion that supports said handlebars and said belly bar and that is adapted to support said handlebars and said belly bar on another component of the industrial machine, wherein said handlebars and said belly bar are formed integrally with one another to form a subassembly, and wherein said mounting portion is connected to said subassembly, and wherein said mounting portion is generally U-shaped, having a lower leg adapted for mounting on the another component of the industrial machine and first and second side legs, each of which extends generally vertically from said lower leg to said belly bar.

14. A handle assembly for guiding an industrial machine, comprising:

(A) a post adapted for connection to the industrial machine; and (B) a guide handle mounted on said post and extending rearwardly from the post, said guide handle including (1) first and second opposed handlebars, each of which is generally U-shaped, having an upper leg, a center leg, and a lower leg that extends laterally inwardly from said center leg to a free end thereof, wherein the handlebars are curved such that the center leg curves generally rearwardly toward an operator of the machine and the lower leg curves generally forwardly away from the operator and toward the post such that the free end faces away from the operator; and (2) a belly bar which extends at least generally horizontally between the handlebars, the belly bar being located behind the post.

15. The handle assembly as recited in claim 14, further comprising a mounting portion that supports said handlebars and said belly bar and that is supported on said post.

16. The handle assembly a recited in claim 14, wherein said mounting portion is affixed to said post so that said guide handle extends from said post at an angle α, α being preselected depending on the length of said post.

17. The handle assembly as recited in claim 16, wherein said mounting portion is welded to one of said post and a saddle mounted on said post.

18. A walk behind trowel, comprising:

(A) a frame;

(B) a motor that is mounted on said frame and that has a rotatable output;

(C) a rotor that includes a plurality of blades which are rotatable about a rotational axis; and (D) an-operator controlled handle assembly including (1) a post extending upwardly and rearwards from said frame, and (2) a guide handle mounted on said post, said guide handle including (a) first and second opposed handlebars, each of which is generally U-shaped, having an upper leg, a center leg, and a lower leg that extends laterally inwardly from said center leg to a free end thereof, and (b) a belly bar which extends at least generally horizontally between the handlebars.

19. The walk behind trowel as recited in claim 18, wherein said guide handle further comprises a mounting portion that supports said handlebars and said belly bar and that is supported on said post.

20. The walk behind trowel as recited in claim 19, wherein said mounting portion is affixed to said post so that said guide handle extends from said post at an angle α, α being preselected depending on the length of said post.

21. The walk behind trowel as recited in claim 20, wherein said mounting portion is welded to one of said post and a support mounted on said post.

* * * * *